(No Model.) 2 Sheets—Sheet 2.
C. F. HEINRICHS.
ELECTRIC BATTERY.
No. 396,870. Patented Jan. 29, 1889.
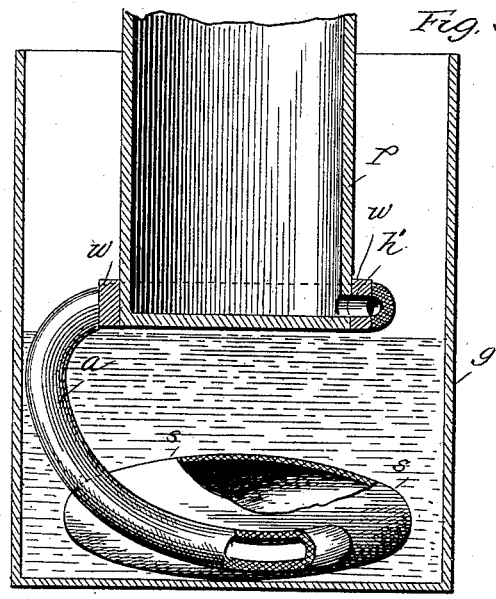
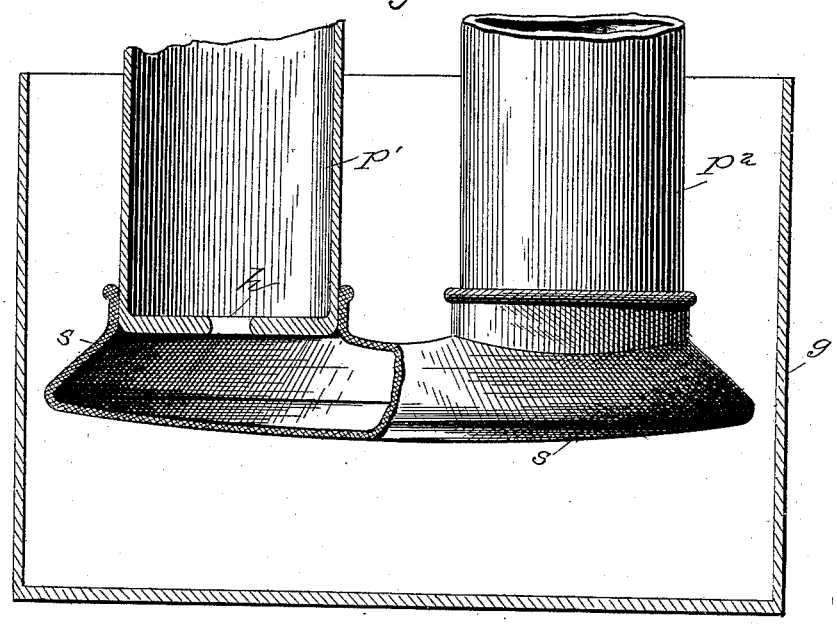

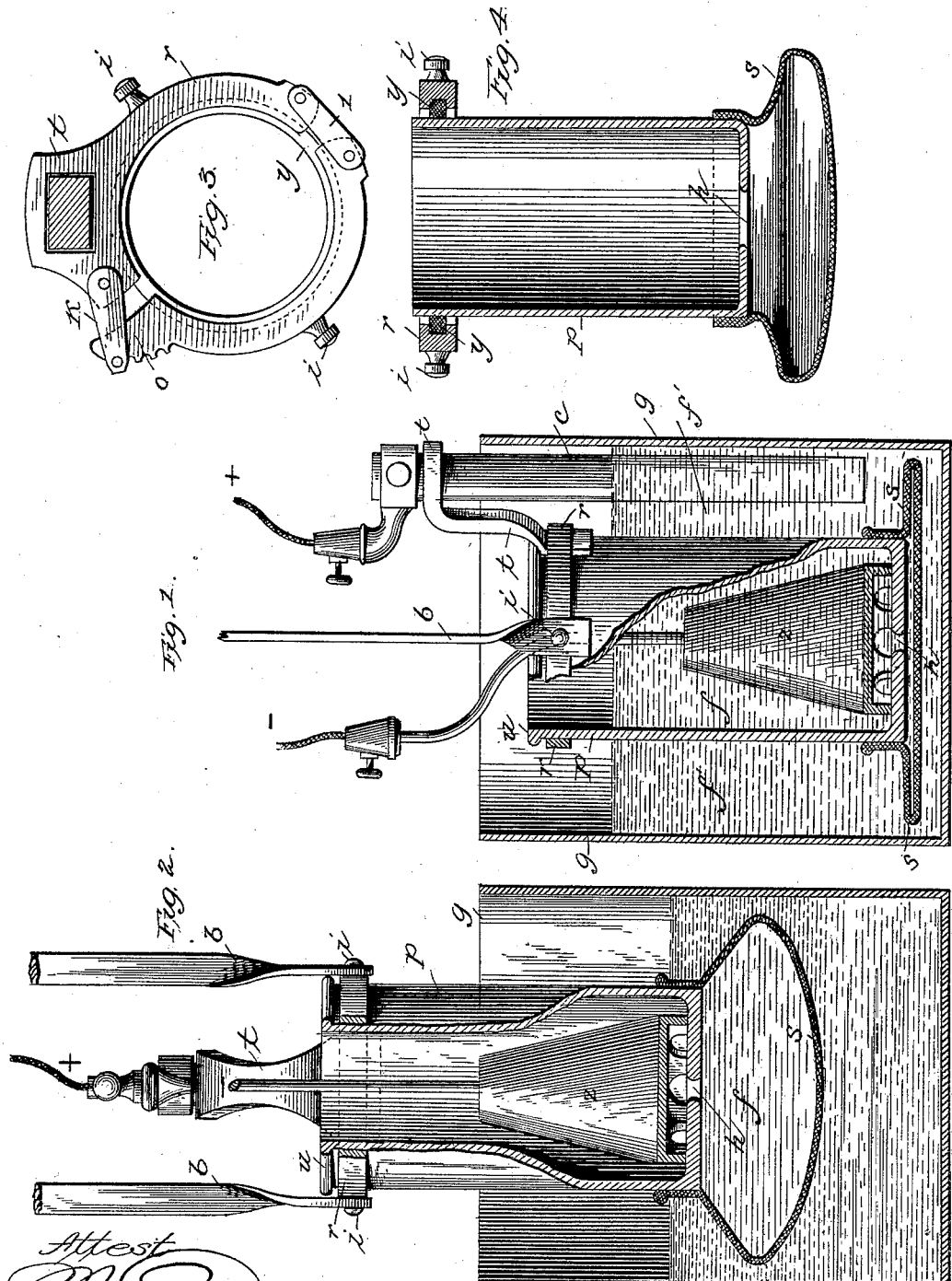

UNITED STATES PATENT OFFICE.

CHARLES F. HEINRICHS, OF NEW YORK, N. Y., ASSIGNOR OF ONE-HALF TO WILLIAM F. WIDMAYER, OF SAME PLACE.

ELECTRIC BATTERY.

SPECIFICATION forming part of Letters Patent No. 396,870, dated January 29, 1889.

Application filed April 14, 1888. Serial No. 270,625. (No model.)

*To all whom it may concern:*

Be it known that I, CHARLES F. HEINRICHS, of New York, in the county of New York and State of New York, have invented a new and useful Improvement in Electric Batteries; and I do hereby declare that the following is a full, clear, and exact description of the same.

My invention relates to improvements in that class of electric batteries in which two or more electrodes with two or more fluids and a porous diaphragm are employed. Batteries of this kind are mostly used during certain periods of time only, and are in use, perhaps, for a few days during a month or for certain hours during the day and stand idle during the night, or vice versa. All the time the fluids will intermix through the porous diaphragm and attack and consume the electrodes. A great economy and greater efficiency can be obtained if the several fluids are kept separated from each other and from both electrodes when the battery is not in use. Further, in practice the several fluids are seldom put into the compartments composing the cell and the porous diaphragm or cup at the same level, and thus the hydrostatic action will force the one fluid quickly through the porous diaphragm into the other fluid until both have the same level, which again represents a waste of useful fluid.

Batteries are already in use in which both electrodes are separated from the fluid or fluids when not in use. Other batteries have also been proposed in which the two fluids were to be kept separated from each other and from one electrode (the zinc) when not in use, and in which the two fluids were to be raised by means of two plungers into the proper position for use; but if the latter proposed plan be applied to any size of battery it will reduce to a very great extent the capacity of the cell; also, the use of the plungers makes the battery cumbersome and complicated.

The present invention has for its object the separation of the several fluids from each other, from the porous diaphragm, and from the several electrodes when the battery is not in use, and also the storing of the fluids within the cell or set of cells whenever the battery is not in use, without materially reducing the capacity of the battery. Further, it provides for the automatic maintenance of an equal level between the several fluids of the battery when in use.

The invention consists, essentially, of a flexible or expansible compartment connected with the porous diaphragm of an electric battery, by means of which the fluids may be stored separately from each other, from the electrodes, and from the diaphragm whenever the porous cup is raised. When, however, the porous cup is lowered, the hydrostatic action of the second fluid surrounding the expansible compartment compresses the latter and replaces the fluid in the porous cup, thereby maintaining a common level of the fluids.

In the accompanying drawings are shown several arrangements in which my invention is carried out. I do not limit myself to the particular arrangements shown, as they may be changed in many ways without departing from the spirit of my invention.

In the drawings, Figure 1 shows a simple form of battery in transverse vertical section, with the parts arranged in place for use. Fig. 2 shows a like section with the porous cup and electrodes raised. Fig. 3 is a modified form, in plan view, of a clamp-ring for the cup. Fig. 4 is a vertical section of the cup and clamp-ring. Fig. 5 represents a modification, in which the jar is shown in section with cup raised, the non-porous flexible bag in section, and the flexible connecting-tube. Fig. 6 shows another modification with jar in section and cups and bag in section partly and partly in side elevation.

The battery consists of glass jar $g$, a porous cup, $p$, zinc electrodes $z$, and carbon electrode $c$. The glass jar contains the fluid $f'$, into which the carbon electrode $c$ is dipping. The porous cup contains the second fluid, $f$, into which the zinc electrode is placed. The porous cup $p$ has a large hole, $h$, in its bottom, and has fixed to or connected with its lower end an expansible compartment in the form of a flexible and non-porous pouch or sack, $s\,s$, into which the fluid $f$ enters whenever the porous cup is lifted. The porous cup has also on its upper end a rim, $u$ $u$, which prevents the cup from passing through its holder $r$ $r$. To the latter are fixed the two studs $i$ $i$, upon which the two bands $b$ $b$ are slipped, which latter again may be attached to any suitable lifting mechanism. To the holder $r$ $r$ is also attached an extension, $t$, into which the carbon $c$ is placed and held. Thus whenever the porous cup $p$ is lifted by the band $b$ $b$ and rim $r$ $r$ the carbon and zinc are lifted with it.

Fig. 1 shows the battery as in use. The electrodes are dipping in their respective fluids, between which the same level is maintained, as is shown hereinafter.

In Fig. 2 the porous cup $p$, with the zinc $z$ and carbon $c$, is shown lifted, and the fluid $f$ has passed out of the porous cup into the extended pouch or sack $s$ $s$, and so the two fluids are stored and separated by means of the non-porous pouch $s$ $s$, and both electrodes are freed from their respective fluids. When the porous cup $p$ is lowered for use, the outer fluid, $f'$, compresses the pouch $s$ $s$ and forces the fluid $f$ into the cup $p$ until both fluids have the same level. As the pouch $s$ $s$ is made of sufficiently large size to take up more fluid than is contained in the porous cup, the same level will be maintained between the two fluids whether the cup with the electrodes has been lowered entirely or only partially into the fluid $f'$, as in cases where a reduced capacity of the battery is only required. The bag $s$ $s$ may also be made larger—say of double or more the capacity of the porous cup—for cases in which the respective amounts of the several fluids are for special purposes specially proportioned.

Instead of the rim $u$ on the upper end of the porous cup $p$, a soft-rubber ring, $y$, Figs. 3 and 4, may be placed upon the upper end of the cup $p$, and the holder $r$ be made in a clamp form having the hinge-plates $l$ and the locking-piece K, with the segmental clamp-extension $o$, allowing different sizes of porous cups to be clamped and held by the holder $r$. The latter has also the extension $t$, into which the carbon $c$ is placed and held.

It will be understood that, although I have described the zinc electrode in the porous cup, the positions of the electrodes may be reversed.

Fig. 5 shows the bag $s$ lying near or upon the bottom of the battery-jar $g$, being connected with the porous cup $p$ by the band $w$, and the flexible tube $a$ entering the cup at the hole $h'$ near the bottom thereof. The action is similar to that described hereinbefore; but in this arrangement the fluid $f$ is not lifted with the porous cup, but enters and leaves the porous cup as the latter is being raised or lowered by the hydrostatic action of the fluid $f'$ on the bag $s$.

Fig. 6 shows an arrangement in which a plurality of porous cells, $p'$ and $p^2$, may have a bag, $s$, common for all. The non-porous bag $s$, I make, preferably, out of pure rubber, which I may also prepare in any suitable and known manner to withstand the action of the acids upon it.

I claim as my invention—

1. In an electric battery, a flexible and expansible compartment connected with a porous diaphragm, by means of which the fluids may be stored, separated from each other, from the electrodes, and from the porous diaphragm, in combination with the second fluid, by means of which the fluid contained in the expansible compartment is replaced into the porous cup, all substantially as described.

2. In an electric battery, a porous cup (containing one electrode) to which is connected a flexible and expanding non-porous chamber, in combination with the cup and electrode-holder and means by which the cup and the electrode may be lowered in the battery or raised out of the same, all substantially as described.

3. In an electric battery, the combination, with the porous cup $p$, of soft-rubber ring and clamp with locking-piece K, electrode-holder extension $t$, studs $i$ $i$, and lifting-bands $b$ $b$, all substantially as described.

4. In combination with the jar of a liquid battery, an interior porous cup containing one electrode and connected with another electrode arranged to dip in the fluid of the cup, and a flexible or expanding non-porous chamber in connection with the porous cup, all substantially as described.

5. In combination, in a liquid battery, a porous cup with connections for raising and lowering it in the cell, an electrode fixed in place in the porous cup, an electrode on the outside thereof, and a flexible non-porous pouch attached to the lower part of the cup and in communication therewith, all substantially as described.

6. In combination, the jar $g$, the porous cup $p$, having a perforated bottom, the non-porous pouch $s$, fixed to its lower end, the holder $r$, having an extension, $t$, carrying an electrode, and an electrode in the porous cup, all substantially as described.

In testimony whereof I have signed my name to this specification in the presence of two subscribing witnesses.

CHARLES F. HEINRICHS.

Witnesses:
ROBERT W. CANDLER,
WILLIAM E. RUDISCHHAUSER.